United States Patent [19]
Kuramoto et al.

[11] 3,756,131
[45] Sept. 4, 1973

[54] EXPOSURE CONTROLLING DEVICE FOR PHOTOGRAPHIC CAMERA

[75] Inventors: Yoshio Kuramoto, Toyonaka-shi, Osaka-fu; Kayoshi Tsujimoto, Higashisumiyoshi-ku, Osaka-shi, Osaka-fu, both of Japan

[73] Assignee: Minolta Camera Kabushiki, Osaka-shi, Osaka-fu, Japan

[22] Filed: June 4, 1971

[21] Appl. No.: 149,938

[30] Foreign Application Priority Data
June 4, 1970  Japan ........................... 45/47553

[52] U.S. Cl. ................. 95/10 CT, 95/42, 95/53 EB
[51] Int. Cl. ...................... G03b 7/08, G03b 17/18
[58] Field of Search ........... 95/10 C, 10 CE, 10 CT, 95/42, 53 E, 53 EA, 53 EB

[56] References Cited
UNITED STATES PATENTS

| | | | |
|---|---|---|---|
| 3,695,159 | 10/1972 | Mita | 95/53 EB |
| 3,641,890 | 2/1972 | Ono | 95/10 CT |
| 3,324,779 | 6/1967 | Tsukamo Nobasama | 95/10 CT |
| 3,533,348 | 10/1970 | Akio Yanagi | 95/10 CT X |
| 3,349,678 | 10/1967 | Minoru Suzuki et al. | 95/10 CT |
| 3,442,190 | 5/1969 | Erickson | 95/10 CT |

*Primary Examiner*—Joseph F. Peters
*Attorney*—Watson, Cole, Grindle & Watson

[57] ABSTRACT

An exposure control circuit is caused to store a voltage representative of the light intensity of a selected principal object within the object field to be photographed by a manually operated member which disconnects a photosensitive element from a capacitive storage element. Operation of the manual member causes a switch interconnecting the photosensitive element with the capacitive storage element to be opened and a restraining member is provided for maintaining the switch in an opened condition until an exposure has been terminated. A cocking member operated in conjunction with the cocking of the camera causes the switch to be closed in preparation for another photograph.

5 Claims, 4 Drawing Figures

INVENTOR.
YOSHIO KURAMOTO
KAYOSHI TSUJIMOTO
BY
WATSON COLE GRINDLE & WATSON
ATTORNEYS

INVENTOR.
YOSHIO KURAMOTO
KAYOSHI TSUJIMOTO
BY
WATSON COLE GRINDLE & WATSON
ATTORNEYS 3,756,131

EXPOSURE CONTROLLING DEVICE FOR PHOTOGRAPHIC CAMERA

BACKGROUND OF THE INVENTION

The present invention relates to an exposure controlling device for a camera and more particularly to an exposure controlling device for controlling the exposure of electric shutter by measuring the light value of an objective field to be photographed or a principal object in the objective field at a desired time prior to exposure to store the light deteched output.

The exposure controlling device for controlling the electromagnet in the electric shutter by means of the delay circuit composed of a photoconductive element and a capacitor and the switching circuit are well known, and it is also well known that in such an exposure controlling device a photosensitive element is arranged to effect a spot light measurement for a specific portion in the objective field to be photographed.

Further, it is also well known that in a single lens reflex camera for measuring the light rays passing through the objective lens, the output of the photosensitive element for measuring the light value of the objective field just before exposure is stored by a storage capacitor and the exposure of the electric shutter is controlled in response to the stored voltage of the storage capacitor.

In all such prior art apparatus, however, it is possible to measure the brightness of a whole objective field to be photographed or a specific objct in the whole objective field just before exposure or during exposure but it is impossible to measure any object light in the whole objective field at any time before exposure and store the detected light value thereof.

Therefore, the expsoure control can only be effected by the detected light value of the whole scene or a specific object in the whole scene.

This fact makes it impossible to measure the correct light value of, for example, a desired object in the counterlight.

In order to measure correctly the light value for a desired object in the objective field to be photographed the photosensitive element of the camera may be brought close to an object before exposure to allow the photosensitive element to measure only the light rays from the object, and storing the detatched value thereof to control the exposure in accordance with the stored value for a desired photographic distance, and the proper exposure including good balance with the background of the object can be obtained.

OBJECTS OF THE INVENTION

A primary object of the present invention is to provide an exposure controlling device for a camera enabling the light intensity of a specific object within an overall object field to be measured at any desired time prior to exposure.

A feature of the present invention is an exposure controlling device for a camera so constructed that a connecting switch for opening/closing a light measuring circuit and a capacitor for storing the signal output thereof at a desired time before exposure are provided, and the exposure of the electric shutter is controlled in accordance with the signal stored by the capacitor.

Another feature of the present invention is that an RC integrating circuit is operated simultaneously with the exposure and the integrated signal and the measured light intensity stored by a capacitor are compared by a differential amplifier circuit. When both signals coincide with each other the termination of the exposure is controlled in accordance with the light intensity of any object in the objective field at any time prior to exposure.

Still another feature of the present invention is that an exposure controlling device for a single lens reflex camera is so constructed that the light passing through the objective lens is measured just prior to exposure and a signal representative thereof is stored by a capacitor and the exposure control of the electric shutter is effected at the time of the subsequent exposure.

Other objects and features of the present invention will be apparent from the following detailed description taken in conjunction with the accompanying figures.

SUMMARY OF THE INVENTION

In order to attain the exposure controlling device of the above-mentioned objects the present invention is so constructed that a photosensitive element for receiving the light rays from an object to be photographed is connected in parallel with a capacitor through a connecting switch, and after the output voltage of the photosensitive element is stored by the capacitor after closing the connecting switch the output voltage is retained by the capacitor by opening the connecting switch. An RC integrating circuit is operated simultaneously with the release operation of a shutter mechanism and a comparison circuit compares the integrated output of the RC integrating circuit with the output stored by the capacitor. When both outputs coincide with each other an electromagnet in a switching circuit terminates the exposure by closing the shutter mechanism.

DESCRIPTION OF THE PREFERRED EMBODIMENT

Figure 1:
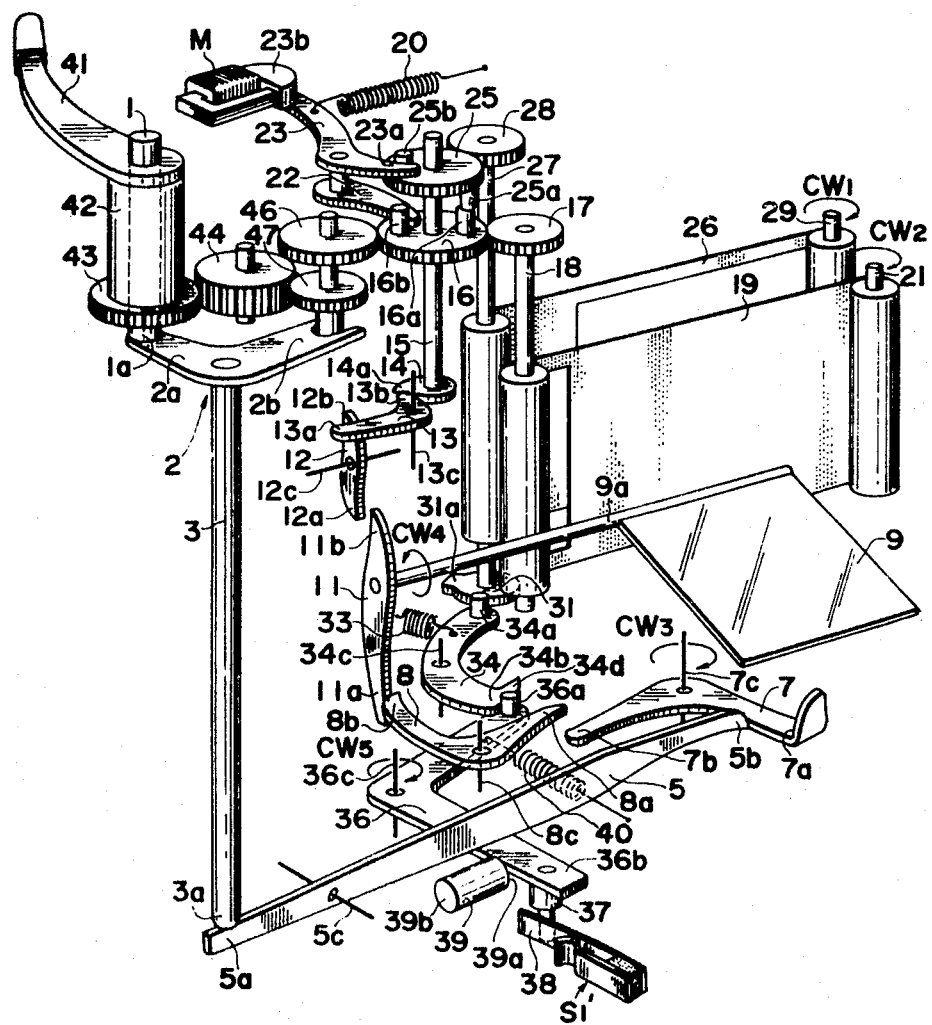
FIG. 1 is a perspective view of an embodiment in accordance with the present invention.

FIG. 1 shows the construction of a camera shutter control mechanism, wherein the shutter is cocked prior to being released. Shutter button 1 shown in the left upper portion of FIG. 1 is mounted slidably in shaft sleeve 42 of winding lever 41, and lower end 1a of shutter button 1 engages with left arm 2a of T-shaped connecting rod 2 which is vertically slidable relative to the camera body.

Lower end 3a of longitudinal shaft 3 of T-shaped connecting rod 2 engages with left end 5a of turning lever 5 which rotates around axis 5c.

Right end 5b of turning lever 5 engages with the flank of one arm 7a of preset lever 7 having a clockwise rotation tendency, namely, in the direction shown from arrow $CW_3$ by a spring not shown in the drawing about axis 7c. When turning lever 5 and preset lever 7 are disengaged through the shutter release operation preset lever 7 is rotated in the direction shown by arrow $CW_3$ to close main switch $S_o$ (not shown in FIG. 1 but shown in FIG. 2) mounted in the turning track thereof, and at the same time other arm 7b of preset lever 7 engages with one arm 8a of intermediate lever 8 rotatable about axis 8c to disengage other arm 8b from lower end 11a of turning lever 11.

Turning lever 11 is provided fixedly on turning spindle 9a along with movable reflection mirror 9 and has counter-clockwide turning tendency, namely, in the direction shown from arrow $CW_4$ by a spring not shown in the drawing, and when disengaged from the other arm 8b of intermediate lever 8 turning lever 11 turns reflection mirror 9 by means of the spring bias from a rest position at 45° with respect to the optical axis to a picture taking position parallel with the optical axis. And at the same time, the other arm 11b of turning lever 11 engages with lower arm 12a of S-shaped intermediate lever 12 about axis of rotation 12c to turn it clockwise.

Upper arm 12b of shaped lever 12 engages with one arm 13a of horizontal lever 13 about axis of rotation 13c, so that the clockwise turning of shaped lever 12 turns horizontal lever 13 counter-clockwise.

The other arm of horizontal lever 13 engages with restraining pawl 14a of restraining plate 14 mounted to turning spindle 15 to which opening screen gear 16 is also mounted and that engagement can be broken through the counter-clockwise turning of horizontal lever 13.

Closing screen gear 25 is rotatably mounted above opening screen gear 16 in an axial position to turning spindle 15.

Opening screen gear 16 is provided with two pins 16a, 16b projecting upward and closing screen gear 25 is provided with connection pin 25a projected downward and restraining pin 25b projecting upward, respectively.

Restraining lever 23 has restraining arm 23a which enters and exits from the turning track of restraining pin 25b and is provided on the end of the other arm thereof with armature 23b facing electromagnet M. Restraining lever 23 has a clockwise turning tendency from spring 20 by means of which armature 23b is separated from electromagnet M. And cocking arm 22 is coaxially mounted with restraining lever 23. Cocking arm 22 is arranged so as to engage with pin 16b on opening screen gear 16.

Shaft sleeve 42 is provided with winding lever 41 and winding driving gear 43, and supported rotatably about shutter button 1 on the camera body. Winding driving gear 43 meshes with intermediate gear 44 supported on the camera body and provided with two coaxial gears 46, 47 supported by a pin on right arm 2b of T-shaped connecting rod 2. Gear 47 always meshes with intermediate gear 44 and gear 46 meshes with opening screen gear 16 when T-shaped connecting rod 2 is in its uppermost position and is disengaged from opening screen gear 16 when T-shaped connecting rod 2 is in its lowermost position obtained by the shutter release operation, thereby forming a clutch mechanism.

Further, open screen gear 16 meshes with gear 17 mounted to winding shaft 18 for opening screen 19 and closing screen gear 25 meshes with gear 28 mounted to winding shaft 27 for closing screen 26. Opening and closing screens 19, 26 are respectively wound, as well known, around take up shaft 21 having a tendency to turn in the direction shown by arrow $CW_2$ and closing screen take up shaft 29 has a tendency turn in the direction shown by arrow $CW_1$.

When winding lever 41 is turned clockwise, opening screen gear 16 is turned clockwise through gear train 43, 44 47, 46, and pin 16a of opening screen gear 16 engages with connecting pin 25a so as to turn closing screen gear 25 counterclockwise. Thereby opening and closing screen gears 16, 25 respectively wind opening and closing screens 19, 26 around winding shafts 18, 27, respectively, from take up shaft 21, 19. And, when the winding of the opening and closing screens is finished restraining pin 25b is turned to a position by passing through restraining arm 23a of restraining lever 23 which has rotated clockwise by means of the tension of spring 20. Subsequently pin 16 engages with charge arm 22 to turn it counterclockwise and accordingly turn restraining lever 23 in the same direction, so as to contact armature 23b with the pole of electromagnet M and confront restraining arm 23a into the returning track of restraining pin 25b. Simultaneously restraining pawl 14a of restraining plate 14 engages arm 13b of horizontal lever 13 and thus the cocking of the shutter is finished.

Closing screen winding shaft 27 has mounted on the lower end thereof cam plate 31 having protrusion 31a, which is arranged to engage with projection 34a on one arm of curved lever 34 having a counter-clockwise turning tendency about axis 34c by spring 33. On the other end 34b of curved lever 34 pawl 34d is formed and is arranged to come into contact with pin 36a fixed on one end of L-shaped lever 36 having a clockwise turning tendency about axis 36c by spring 40. When pawl 34d engages with pin 36a it is restrained by L-shaped lever 36. On the other arm 36b of L-shaped lever 36 there is fixed downwardly projecting pin 37 made of an insulating material, and projection pin 37 faces contact piece 38 of connecting switch $S_1$. When L-shaped lever 36 rotates into clockwise position connecting switch $S_1$ is closed and when pin 36a of L-shaped lever 36 rotates into a counter-clockwise position engaging with pawl 34d of curved lever 34 connecting switch $S_1$ is opened.

Button 39, one end 39a of which faces the flank of arm 36b of L-shaped lever 36, is supported slidably on the camera body and the other end 39b thereof protrudes outside of the camera body. By pushing end 39b button 39 turns L-shaped lever 36 counter-clockwise against spring 40, opens connecting switch $S_1$, and simultaneously as described above pin 36a engages with pawl 34d to hold connecting switch $S_1$ open.

Figure 2:
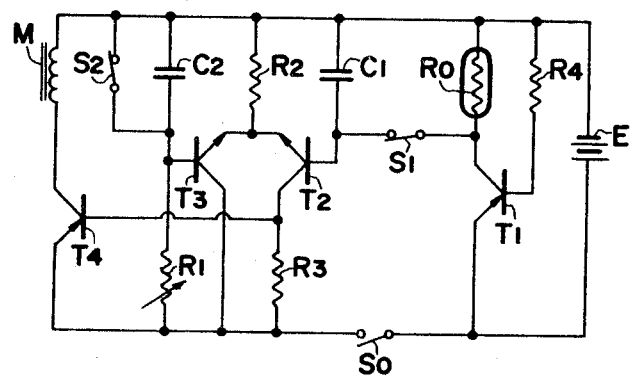
FIG. 2 is a circuit diagram of the control circuit for that embodiment.

In FIG. 2 electric power source E, photosensitive element $R_o$ and transistor $T_1$ are connected in series, and the base of transistor $T_1$ is connected to the negative side of power source E through resistance $R_4$.

The collector of transistor $T_1$ is connected to the base of transistor $T_2$ through connecting switch $S_1$ and condenser $C_1$, for storing the measured light signal is connected to the negative side of power source E in parallel with photosensitive element $R_o$.

Power source E, main switch $S_o$, transistor $T_4$, and electromagnet M are connected in series and the base of transistor $T_4$ is connected to the collector of transistor $T_2$. Trigger switch $S_2$ is connected in parallel with capacitor $C_2$, and is opened simultaneously with opening of the shutter and time constant resistance $R_1$ is connected in series with both capacitor $C_2$ and switch $S_2$ to constitute an RC integrating circuit. And, the connecting point of time constant elements $C_2$, $R_1$ is connected to the base of transistor $T_3$. Between emitters of transistors $T_3$ and $T_2$ common bias resistance $R_2$ is inserted, and the collector of transistor $T_2$ is connected to the base of transistor $T_4$ as described above and to the positive side of power source E through resistance $R_3$ and main switch $S_o$, so as to constitute a differential amplifier circuit. When the charging voltage of time delay capacitor $C_2$ coincides with the voltage stored by capacitor $C_1$, transistors $T_2$, $T_3$ are made conductive and transistor $T_4$ is shut off.

Also, resistance $R_1$ can be a variable resistance varied in accordance with the diaphragm setting and the film sensitivity setting, and in this manner, after the measured light intensity is temporarily stored even though the diaphragm setting and the film sensitivity setting are changed, exposure control can be effected.

Since the present invention is constructed as described hereinbefore, in the objective field to be photographed when there is a remarkable contrast in the brightness of the principal object, by bringing the camera close to the object to allow the photosensitive element to receive only the light rays from that object the light measurement is effected, and in order to allow condenser $C_1$ to temporarily store the detected light signal button 39 is pushed. And thus, L-shaped lever 36 is turned counter-clockwise and insulating pin 37 thereof releases contact piece 38 of connecting switch $S_1$ and accordingly connecting switch $S_1$ is opened. Therefore, capacitor $C_1$ stores the detected light output at that time. Further, pin 36a on the other end of L-shaped lever 36 engages with pawl 34d of curved lever 34 to be restrained against spring 40 so as to keep connecting switch $S_1$ open.

At this juncture, if electrically connecting switch $S_1$ is closed, and in FIG. 2 the current of transistor $T_1$ is constant, so provided that the collector current of transistor $T_1$ is $i$, the impedance of photosensitive element $R_o$ is $r_o$, and the terminal voltage of photosensitive element is $V_o$, $V_o = i\, r_o$. That is, $V_o$ represents the meaured light value of the object, and voltage $V_o$ is stored by capacitor $C_1$ when connecting switch $S_1$ is closed.

Thereupon, after setting a desired photographic distance to the object and focusing, upon pushing shutter button 1 T-shaped connecting rod 2 descends, turning lever 5 is turned counter-clockwise by longitudinal shaft 3, and preset lever 7 is released, so that preset lever 7 is turned in the direction shown by arrow $CW_3$ to close main switch $S_o$. Simultaneously therewith, preset lever 7 engages with intermediate lever 8 to turn it counter-clcokwise. And accordingly, intermediate lever 8 and turning lever 11 are disengaged and turning lever 11 is turned in the direction shown by arrow $CW_4$ by means of its tendency to turn reflection mirror 9 to the picture-taking position.

Then, upper end 11b of turning lever 11 moves S-shaped lever 12 which is thereby disengaged from horizontal lever 13 to release restraining plate 14 mounted to turning spindle 15.

And at the same time, just as T-shaped connecting rod 2 descends, gear 46 is released from engagement with opening screen gear 16, so that opening screen gear 16 and turning spindle 15 are driven via opening screen 19 through the turning tendency of the opening screen take up shaft 21 in the direction shown by arrow $CW_2$ to start the movement of opening screen 19. And pin 16b releases cocking arm 22 and pin 16a is disengaged from connection pin 25a, however, in the electric circuit closed by main switch $S_o$, transistor $T_4$ is conductive and electromagnet M thereby excited, so that restraining lever 23 engages with restraining pin 25b of closing screen gear 25 to prevent the latter gear from turning.

Just as opening screen 19 starts to move, as is well known, trigger switch $S_2$ is opened and delay capacitor $C_2$ begins to be charged with the current in accordance with resistance $R_1$, and when the charging voltage of delay capacitor $C_2$ coincides with the detected light voltage stored by capacitor $C_1$ the output of the differential amplifier circuit switches transistor $T_4$ non-conductive. Electromagnet M is demagnetized to start closing screen 26 and thus the exposure is terminated. And at the same time, on account of the turning of closing screen winding shaft 27, cam plate 31 turns and protrusion 31a engages with projection 34a of curved lever 34 to turn curved lever 34 clockwise. Accordingly pawl 34d of curved lever 34 is disengaged from pin 36a of L-shaped lever 36 which is turned clockwise by spring 40 to restore it to its original position and thereby button 39 is restored to its original projecting position.

Figure 3:
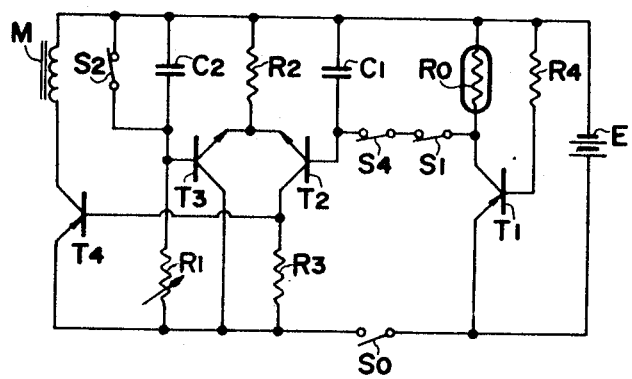
FIG. 3 is a circuit diagram of another embodiment of the control circuit in accordance with the present invention.

In contrast to the embodiment just described, in another embodiment shown in FIG. 3 switch $s_4$ is inserted in series with connecting switch $s_1$ between photosensitive element $R_o$ and condenser $C_1$ for storing the detected light voltage, and as long as connecting switch $S_1$ is closed switch $S_4$ is closed so as to transfer the stored voltage to capacitor $C_1$ just prior to the turning of turning lever 11. Before turning lever 11 is turned, switch $S_4$ is opened to allow condenser $C_1$ to store the voltage, for example, switch $S_4$ is so constructed as to open and close in connection with the turning of preset lever 7 shown in FIG. 1. The other components are the same as those of the embodiment shown in FIG. 1 and FIG. 2, and identical symbols denote identical parts.

Figure 4:
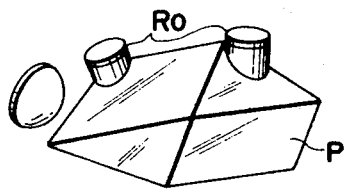
FIG. 4 is a perspective view of the embodiment in accordance with the present invention wherein the components are cocked.
Figure 4:
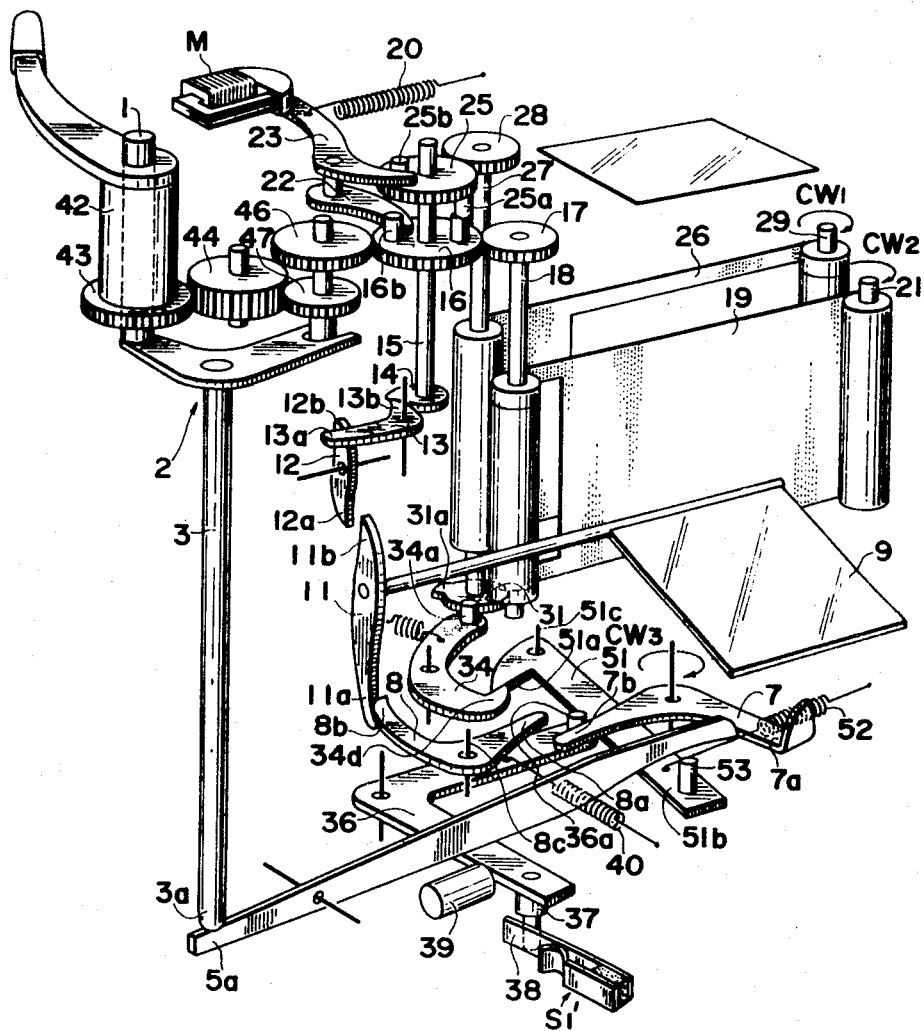

FIG. 4 shows an embodiment using one switch $S_1'$ for both connecting switch $S_1$ and switch $S_4$, and the other components are the same as in the embodiment shown in FIG. 1 and FIG. 2, and identical symbols denote identical parts.

That is, FIG. 4 shows the condition wherein the shutter charge is finished, and left arm 7b of preset lever 7 is able to engage with right arm 8a of intermediate lever 8 in its turning track and to engage with pin 36a mounted on the one end of L-shaped lever 36.

And, under preset lever 7 there is provided lever 51 having hook 51a on its one arm which engages with pin 36a, and lever 51 has on its other arm spring 52 for providing a counter-clockwise rotation about axis 51c. Pin 53 mounted on arm 51b is in the turning track of the right arm 7a of preset lever 7.

As to the photosensitive element, in FIG. 4 photoconductive element $R_o$ is provided on pentagonal prism P so as to measure light rays passing through the objective lens.

Therefore, when capacitor $C_1$ stores the detected light voltage of a desired object in theobjective field to be photographed, in the state shown in FIG. 4, upon bringing the camera close to that object and pushing the button, connecting switch $S_1'$ is opened and pin 36a of L-shaped lever 36 is restrained and its position is held against spring 40. And, when controlling the exposure by storing the lightness of the objective field just prior to exposure, upon performing the release operation, just as connecting switch $S_1'$ is left in the closing state preset lever 7 is rotated to turn pin 36a of L-shaped lever 36 so as to engage it with pawl 34d in the same manner as described above. Thereby, connecting switch $S_1'$ is opened to let capacitor $C_1$ store the detected light voltage. In any mode of photographing, as soon as the exposure is terminated cam plate 31 turns curved lever 34 to release the restraint effected by pawl 34d, so that L-shaped lever 36 is returned to close connecting switch $S_1'$, and simultaneously lever 51 is turned counter-clockwise by spring 52 and pin 53 thereof engages with preset lever 7 to push it to its original position.

Then, upon cocking the shutter by means of the winding lever, curved lever 34 is turned clockwise and pawl 34d thereof engages with hook 51a of lever 51 to turn it clockwise against spring 52 to return it to the original position shown in FIG. 4.

What is claimed is:

1. An exposure controlling device for a photographic camera comprising:
   a photosensitive element for receiving light from a selected object with an object field to be photographed and generating an output representative thereof;
   a capacitor for storing a voltage in accordance with said output;
   first switch means for connecting said capacitor to said photosensitive element;
   shutter exposure mechanism actuated by the camera shutter release mechanism;
   a shutter control circuit for controlling said shutter exposure mechanism to obtain an exposure in response to the stored voltage of said capacitor; and
   a manually operative means actuated independently of said shutter release mechanism solely for opening said first switch means prior to a shutter release operation.

2. An exposure controlling device as in claim 1, further comprising, means for preventing closure of said first switch means opened by said manually operative means.

3. An exposure controlling device as in claim 2 wherein said camera further comprises means for releasing said means for preventing closure of said first switch means interlocked with the operation of said shutter exposure mechanism.

4. An exposure controlling device for a single lens reflex camera having a movable reflector, comprising:
   a photosensitive element for receiving light rays passing through the objective lens of said camera and reflected by said movable reflector;
   a capacitor for storing photometric data connected in parallel with said photosensitive element;
   first switch means for connecting said capacitor to said photosensitive element;
   a shutter control circuit for controlling an exposure in response to the voltage stored by said capacitor;
   a manually operative means for opening said first switch means prior to a shutter release operation;
   a shutter release mechanism;
   a second switch means serially connected with said first switch means between said capacitor and said photosensitive element; and
   means for automatically opening said second switch means before movement of said movable reflector in interlocking relationship with the starting of said shutter release mechanism.

5. An exposure controlling device for a single lens reflex camera having a movable reflector, comprising:
   a photosensitive element for receiving light rays passing through the objective lens of said camera reflected from said movable reflector;
   a capacitor for storing photometric data connected in parallel with said photosensitive element via a connecting switch;
   a shutter control circuit responsive to the voltage charged on said capacitor;
   a push button for manually opening said connecting switch;
   a means for automatically opening said connecting switch before movement of said movable reflector in interlocking relationship with the shutter release operation;
   a member for restraining said connecting switch in the opening state; and
   a means for releasing said restraining member in interlocking relationship with the closing operation of the shutter.

* * * * *